INVENTORS
JOSE REINES
M.A. BOUKNECHT
H. MEDINA
BY ATTORNEY 3,536,846

ELECTRONICALLY CONTROLLED SWITCHING SYSTEM USING REVERSIBLE RING TRANSLATOR

Jose Reines, Brookfield, and Max A. Bouknecht and Hector Medina, Melrose Park, Ill., assignor to International Telephone and Telegraph Corporation, New York, N.Y., a corporation of Delaware Filed Nov. 21, 1967, Ser. No. 684,812
Int. Cl. H04q 3/47
U.S. Cl. 179—18 14 Claims

ABSTRACT OF THE DISCLOSURE

An electromechanical switching network is controlled by a central data processor. The central processor incorporates means for performing most of the functions of the registers, senders, and other equipment. The processor instructs interface equipments to cause the completion of the operations. A ring translator is used as a reversible device which may be read in a forward direction to convert directory numbers into equipment locations and in a reverse direction in order to convert equipment locations into directory numbers. Items of information (other than pure equipment locations) required by the central data processor to serve a subscriber's needs accompany the translator's read-out of the equipment locations and directory numbers.

This invention relates to telephone switching systems generally and more particularly to electronically controlled electromechanical switching systems using centralized data processors.

Historically, the art of automatic switching has developed into commonly controlled electromechanical switching networks. More recently, there have been simultaneous developments in two directions. First, efforts have been made to develop improved switching networks capable of performing more sophisticated switching. An example of this development is found in a co-pending application, entitled "Automatic Switching Matrix," Ser. No. 430,136, field Feb. 3, 1965, now Pat. No. 3,441,677 by Erwin, Field and Mahood, and assigned to the assignee of this invention. Second, efforts have been made to extend the development of the centralized controls to become more like a data processor or the type generally found in the computer arts.

At this stage in the development of switching, there is a relatively great need for a data processor controlled switching system using the newest type of electromechanical network. This way, there will be no hiatus in development of switching systems during which the public is obligated either to forego the opportunity to use the newest data processor type of control or to endure the "bugs" sometimes inherent in new products which have just been introduced to the market. Moreover, data processors for such electromechanical systems provide a logical means of allowing existing equipment to be updated to give the most modern type of service without being obsoleted by the newer.

Yet another reason for development electromechanical systems controlled by data processors is to provide alternative sized systems. Thus, certain new data processor controlled systems might prove economic in the medium size office. But, they would be too expensive in both the small and the larger size offices. Thus, there is a need for systems having economical growth patterns which extend the sizes both above and below the more conventional size office.

Accordingly, an object of the invention is to provide new and improved switching systems. More particularly, an object is to provide electromechanical systems controlled by data processors. Here an object is to provide systems enabling data processors to control conventional electromechanical equipment.

Another object of the invention is to provide economical switching systems of various sizes. In particular an object is to provide systems which are economical in sizes which are either too small or too large to be provided by other systems.

In keeping with an aspect of the invention, the above and other objects of the invention are accomplished by means of a data processor for controlling electromechanical switching networks. More particularly a switching network of the type disclosed by the above identified Erwin et al. application is controlled responsive to a programmed series of command signals. The program is provided by wired logic with the central processor using a ring translator, in which wires are threaded through the ring counter cores to provide binary address words which may be read out by selectively energizing any of the wires representing subscriber lines—either calling trunks, registers, senders, etc. Thus, when a function relates to the calling party, the wire individual to the calling subscriber is energized. The ring translator reads out a binary address word containing all pertinent information required to complete a connection. When a function relates to the called number, a scanner sequentially and successively energizes the various wires relating to all of the subscribers identified in the ring translator. A comparison circuit compares the readout until a binary address word appears which identifices the called party. Then the setting of the scanner is read to learn the identity of the called party.

The above mentioned and other features and objects of this invention and the manner of obtaining them will become more apparent, and the invention itself will be best understood by reference to the following description of an embodiment of the invention taken in conjunction with the accompanying drawings, in which.

Figure 1:
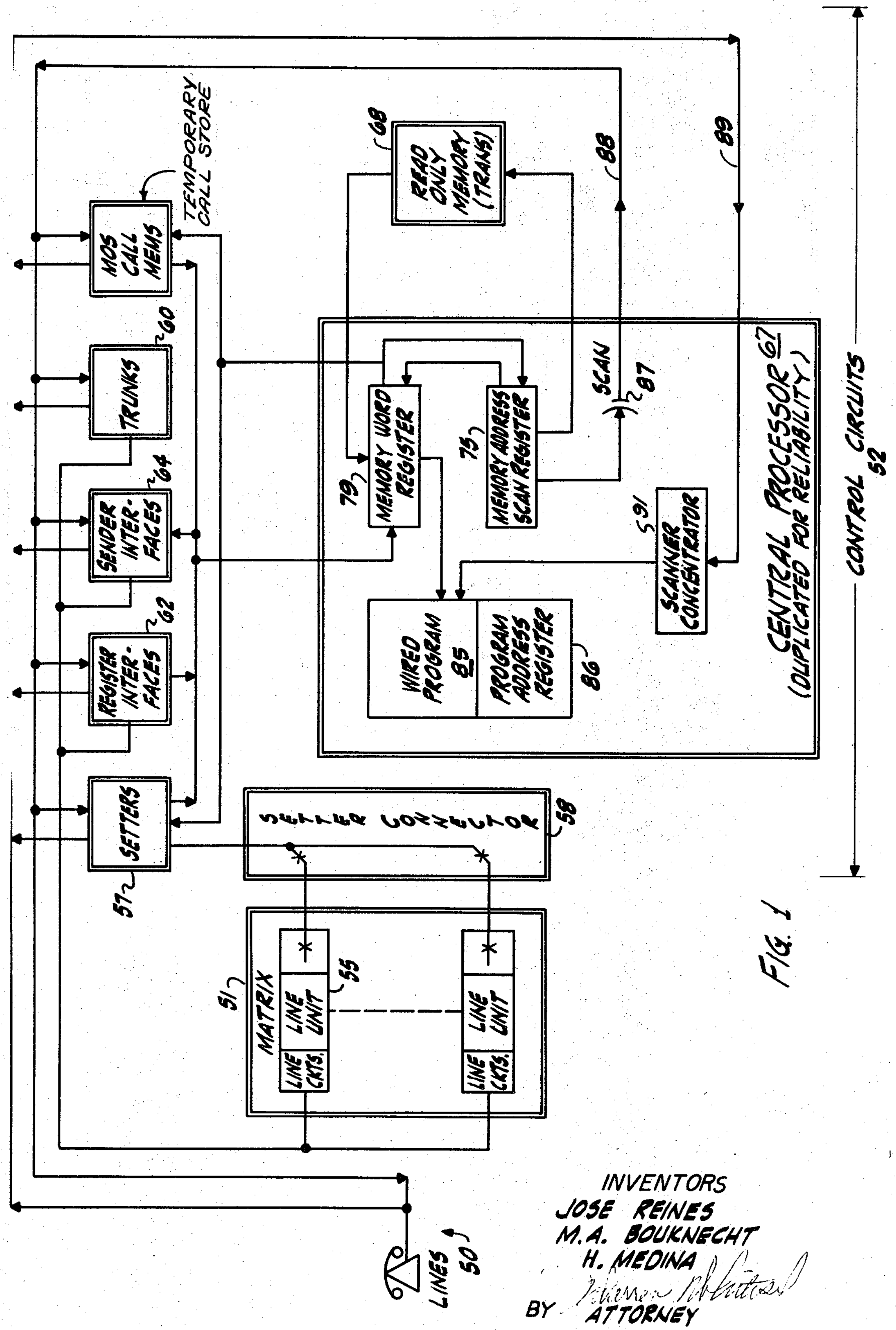
FIG. 1 is a block diagram showing a network having lines connected to one side, control circuits connected to the other side and a common control comprising a central processor and its associated peripheral equipments.
Figure 2:
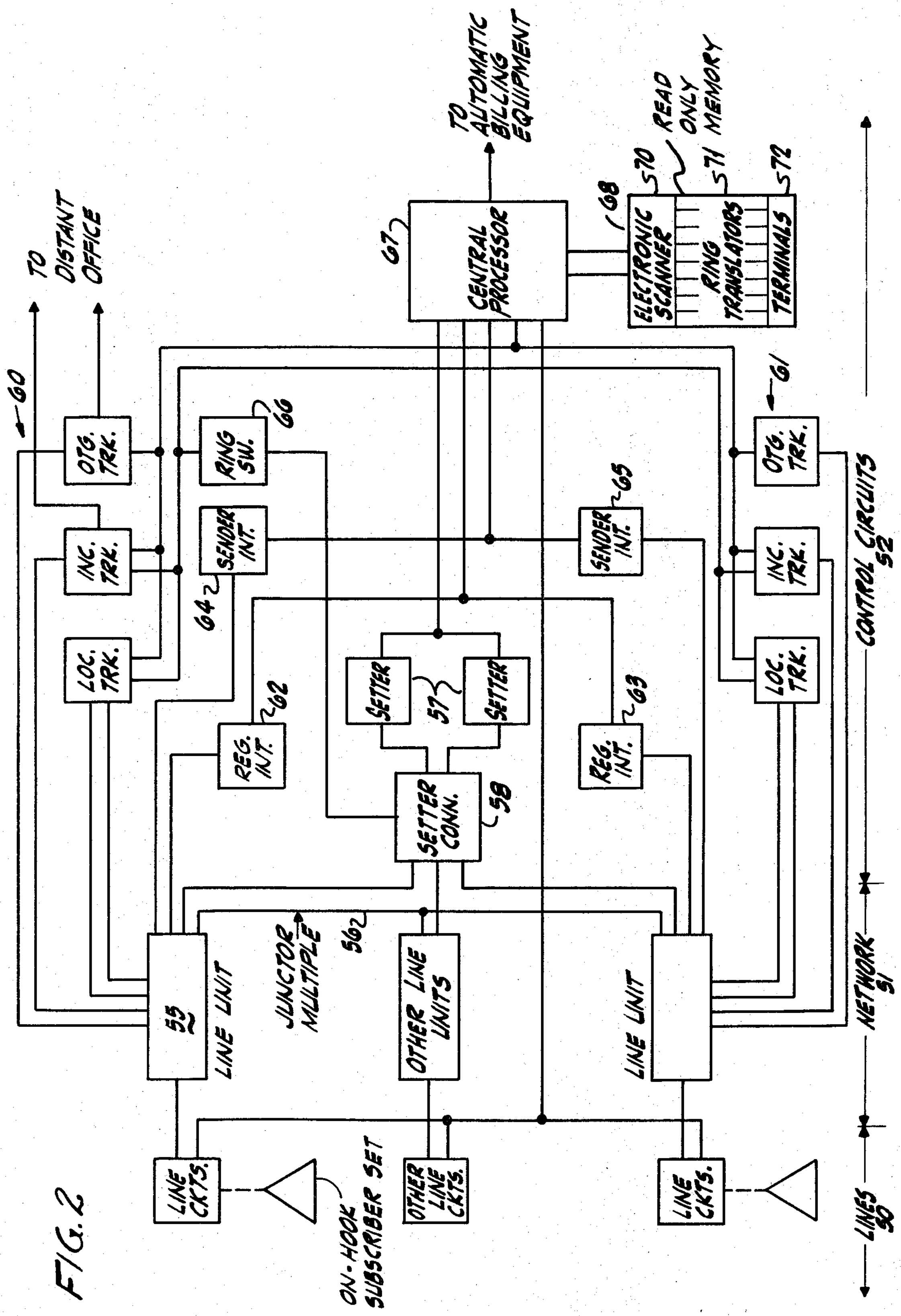
FIG. 2 is a similar block diagram expanding the concepts to show how a multiplicity of equipments are interassociated.

FIG. 1 and FIG. 2 are block diagrams of an exemplary system incorporating the principles of the invention. The major parts of this system are a plurality of subscriber lines 50, a switching network 51, and a plurality of control circuits 52. The lines 50 are connected to one side and the control circuits 52 are connected to the other side of the network 51.

The network is that disclosed in the above identified Erwin et al. co-pending application. As will become more apparent from a study of it, the network is divided into a plurality of "line units" (such as 55) which are adapted to operate more or less autonomously. For the smaller size systems there is no need to provide inter-line-unit switching facilities, since those functions are provided by simple wires (such as junctor 56) which are fanned out between the line units. For larger systems, central switching facilities called "link switches" may be provided. However, they are provided to increase network size, and they are not essential to the workings of the system.

For more information on the above described system, reference may be made to any of the following co-pending applications, all assigned to the assignee of this invention:

| Inventor | Invention | Serial No. | Date filed |
|---|---|---|---|
| H. M. Anderson. | Crossbar Switching Having Split Group Hunting. | 653, 908 | 7/17/67 |
| R. Cohen---- | Idle Test Circuits For Folded Networks. | 623, 267 | 3/15/67 |
| E. L. Erwin, et al. | Automatic Switching Matrix (now U.S. Pat. No. 3,441,677). | 430, 136 | 2/3/65 |
| E. L. Erwin-- | Magnetic Latching Switch (now U.S. Pat. No. 3,400,225). | 471, 574 | 7/13/65 |
| E. L. Erwin et al. | Preference Channel Selector For Switching Network Marker. | 623, 339 | 3/15/57 |
| J. P. Field---- | Tandem Trunking Network (now U.S. Pat. No. 3,387,092). | 465, 510 | 7/16/65 |
| Do------- | Automatic Switching System Having Reduced Dial Pulse Delay. | 623, 420 | 3/15/67 |
| C. Vazquez--- | Miniature Contact Set (now U.S. Pat. No. 3,396,257). | 626, 579 | 3/28/67 |
| Do------- | Switching-Selecting Device (now U.S. Pat. No. 3,360,626). | 468, 071 | 6/29/65 |
| Do------- | Miniature Crossbar Switch with Mechanical Latch. | 673, 791 | 10/9/67 |
| T. B. Westfall, R. Y. Sims. | Crossbar Switching System with Relatively Uniform Growth Characteristics. | 634, 615 | 4/28/67 |

The switching equipment may be any of many available and suitable devices, such as the well known crossbar switches commonly used in automatic telephony. When conventional switches are used, the verticals are cut in order to provide isolated sections of crosspoints. In more modern devices, individual crossbar switches may be used to provide each of the individual crosspoint sections. An example of such a modern switch is the so-called "Mini-Switch" disclosed in the co-pending Vazquez applications identified above. The Erwin et al. network is laid out to take maximum advantage of the "Mini-Switch."

Since the subject invention seeks to maximize the use of the most modern data processing techniques, it naturally turns to a utilization of electronic devices. Therefore, the system requires interface equipment (here called "setters" 57) for adapting the electronic equipment to control the electromechanical switches. A particular advantage derived from this use of separate interface logic is that the data processor may thus be adapted to the control of virtually any existing equipment. For example, the setters 57 may be adapted to work into the Erwin et al. equipment and into the "Number 5" or "Pentaconta" crossbar systems. They may also be adapted to work into glass-reed networks or solid state networks. In fact, if the setters are connected to the sleeves of step-by-step switches, those switches may be operated as finders or trunk hunters to be controlled by the data processor of the subject invention. This way, the subject invention becomes ideal as add-on equipment which may be used to expand existing switching facilities.

The setter connector 58 is any suitable device for connecting the switching network to the interface setters 57. For example, it could be a simple rotary switch for selectively connecting the select and hold magnets of the line unit crossbar switches to the setters.

While FIG. 1 and FIG. 2 only show three or so line units, one setter connector 58 and two setters 57, it should be understood that any suitable amount of equipment may be used according to system needs.

The control equipment (or control circuits) 52 includes trunks 60, 61; registers 62, 63; senders 64, 65; a switch (66) for selecting any appropriate ringing current, a central data processor 67; and a read only memory translator 68. Insofar as the network 51 is concerned all of these control circuits are collectively called "trunks." Hence, the network 51 is described as having lines connected to one side and trunks connected to the other side.

The trunk circuits 60, 61 may be any of the well known circuits for performing the necessary functions. Generically, they are known here as a local trunk "LOC," an incoming trunk "INC," and an outgoing trunk "OTG." Any of these trunks may or may not have access to other equipment at distant offices, as indicated by the legent "To Distant Office." The design, numbers, and types of trunk circuits may change as the office grows in size or interconnects with other offices. Also the distribution of trunks in the system is made on the basis of a need for a smooth homogeneous flow of traffic.

The registers 62, 63 are interface devices capable of storing any one of the decimal digits "0, 1, 2, 3, 4, 5, 6, 7, 8, 9." They receive these digits one at a time as the subscriber (or operator) dials them (or keys them). When each complete digit is received, the register interface 62 or 63 interrupts the central processor 67 and gives it the digit, thereby emptying the storage facilities at the interface preparatory to receipt of the next digit. This way the central processor receives and stores all digits, as they are received. Obviously, therefore, the priorities are such that the interruption from the register interface equipment 62, 63 will be saved during the inter digit time interval so that the interface register tanks will be empty and waiting when the next succeeding dial pulses are received.

Briefly in resume, the register interface performs the following basic functions:

(1) Holds the connection to the subscriber by grounding the sleeve lead.

(2) Provides the path to introduce dial tone to the subscriber from the tone circuit.

(3) Counts dial pulses from the subscriber and determines when a digit is complete (same for multi-frequency signalling).

(4) Indicates to the central processor when a complete digit has been dialed.

(5) Recognizes an open loop condition (subscriber hang up).

(6) Provides time out for incompleted dialing.

The Register interface has no storage other than that for the digit which is being dialed at the time of pulse counting. It acts only as buffer or interface between the subscriber (through the matrix) and the central processor.

Register interface's are provided in the system on the same basis as registers are required in a conventional crossbar system. They have no control function other than line supervision during dialing.

The senders 64, 65 are also interface equipments adapted to receive the digital information stored in the central processor, a digit at a time and send it out to any suitable equipment in any known manner. Again the priorities are such that the sender interface may interrupt the central processor to demand the digits as they are to be sent out. Since the subscriber (or operator) has control over the incoming digits while the central processor has control over the outgoing digits, the register interface equipment 62, 63 has priority over the sender interface equipment 64, 65 in case of conflict. Also, the sender interface should be adapted to cope with the so-called machine "talk" problems.

For example, some offices are adapted to give stop-start signals which the sender must recognize and heed, as required. Again the sender problems are much simpler than the register problems because they are machine-to-machine problems which may be solved within the machine. Thus, the central processor 67 and trunks 60, 61 may be modified or designed to assume many of the burdens of sending out the digits.

Briefly in resume, the sender interface performs the following basic functions:

(1) Holds the sender interface to trunk connection by grounding the sleeve.

(2) Recognizes loop signals from the distant office such as stop dial reversals, etc.

(3) Accepts one digit at a time from the central processor and outpulses it at the proper time.

(4) Indicates to the central processor that the digit has been outpulsed.

The sender interface has no storage other than that for the digit to be outpulsed. The outpulsing is accomplished by an integrated circuit count down counter, the output of which drives a mercury relay. The sender interface acts as a buffer or interface between the trunk (through the matrix) and the central processor. Sender interfaces are provided in the system on the same basis as senders are required in a conventional crossbar system.

The inventive switching system employs a high speed, integrated circuit central processor 67 for all major control functions. The processor is capable of controlling the system for the complete office size range, and it is not necessary to add to the processor as the office grows.

The control functions performed by the central processor include: recognizing all requests for service, hunting for all circuits, selecting paths through the matrix, processing all digits received and sent, and performing those control functions normally associated with registers and senders. In order to complete these functions, the processor uses a program of wired logic which is addressed responsive to the command words read out of a time sequence control provided by the Program Address Register 86. Translation is performed by a ferrite-core, read-only-memory, controlled by the processor.

The processor 67 may be duplicated for reliability, with one set of equipments on-line and operating while the other is off-line and passive. In case of trouble, the passive unit is automatically switched on. At fixed intervals, the active and passive units change roles automatically.

The central processor controls the performance of the following types of connections and calls:

Subscriber to register interface connections.
Incoming trunk to register interface connections.
Intraoffice local calls.
Incoming trunk to subscriber connections.
Sender interface to outgoing trunk connections.
Subscriber to outgoing trunk connections.
Incoming trunk to outgoing trunk tandem calls.
No sender interface type outgoing calls.
Incoming trunk to tone source calls.
Set line lock out (alternatively, set permanent signal holding trunk).
Incoming trunk to in-dial line connections.
No test calls.

The central processor 67 receives the digits from the register interface as they are received from the calling subscriber or operator. These digits identify and indicate the nature of the various calls and connections, as for example, those listed above. The indicated call or connection is, in turn, completed when various potentials and signals are applied to the various wires and terminals required to identify equipment necessary to complete the connections and calls.

For example, the incoming digits may identify the directory number of a local subscriber station which may be connected to a calling subscriber station when certain specified crosspoints, control circuits, ringing generators, and the like are selected and operated. To make the selection, it is only necessary for the central processor to take in the digital information, process it, and deliver the computed output to the setters 57. The setters energize the indicated select and hold magnets. Crosspoints close in the network 57 and a path is completed to equipment which may perform the desired functions.

The read only memory translator 68 is adapted to receive the digital information supplied to it from the central processor and to deliver a binary address word output signal containing all of the information and control signals required to complete the necessary connection. In greater detail, the memory 68 includes a relatively tall rack of equipment divided vertically into three sections, 70, 71, 72. Section 70 includes a plurality of electronic circuits adapted to scan and select any of many wires—up to, say three to five thousand wires, for example, although the exact number is not too important. Section 71 is divided vertically into any convenient number of sub-racks, such as eight, for example. Each sub-rack includes a convenient number of cores corresponding to the number of bit positions in a binary address word required by the central processor. Therefore, a single wire may represent a single subscriber station. If there are, say, one thousand wires in each sub-rack and eight sub-racks in section 71, there is capacity for storing the information required to serve an exchange of eight thousand subscribers.

Each wire starts at a terminal at the top of memory 68 in the section scanned by the electronic equipment at 70. Then the wire threads through the cores in section 71 according to the address word which describes the pertinent subscriber. For example, if the word were 101 . . . 110 the wire would go through the first core, outside the second core, through the third core . . . through the N–2 and N–1 cores and outside the Nth core. Thereafter, the binary word 104, 105, 106, 107, 108, 109, 110 is read out whenever that wire is energized. While it is not too important to the invention it might be noted that it is very easy to change the binary address words if the cores in section 71 are in vertical alignment. This way, it is only necessary to identify desired terminals in sections 70 and 72, clip both ends of a wire and pull it from the memory.

The section 71 is divided horizontally to provide the read out equipment. The number of horizontal divisions depends upon the number of bits in a binary address word. Thus, if there are, say thirty to forty bits in a binary word, there are thirty to forty horizontally aligned read out sections. The section 72 includes any convenient number of terminals for completing the connections to the various wires in the memory.

The exact format and nature of the binary address word may change from system to system. In general, it describes the subscriber's equipment locations, the form of ringing current required to signal the subscriber station, the class of service given, any type or form of Centrex services provided, etc. In the case of a call to a PBX, the binary address word is an indirect address of other equipment which commands PBX hunting. When the central processor receives this address, the controls are directed to a different program which instructs the system to hunt for idle equipment. In this way, it is theoretically possible that all lines in the entire exchange will form part of a single PBX group designated by a single pilot number with all of the actual lines identified in the program read by the indirect addressing technique. That is, of course, an extreme case. For night service, each line given a specific single directory number would be identified in the conventional manner.

Figure 3:
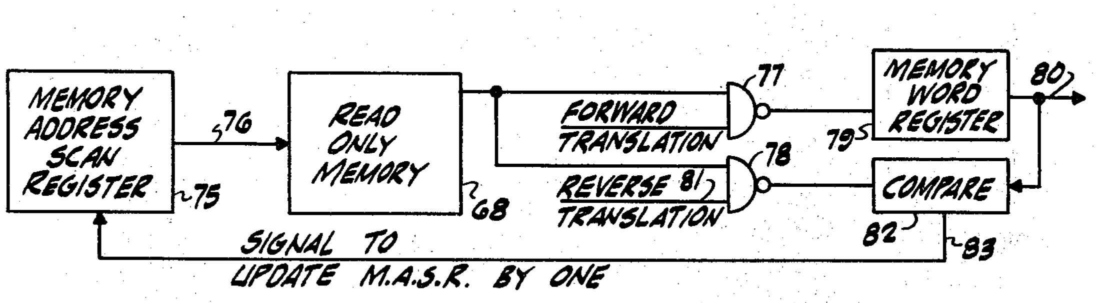
FIG. 3 is a block diagram showing the logical control of a bidirectional ring translator.

The interaction between the central processor and the read only memory 68 may become more apparent from a study of FIG. 3. Except for the read only memory 68, the equipment shown here is located in the central processor. In greater detail, it includes a memory address scan-register 75 which is able to select any wire running through section 71 of the memory circuit. This selective energization is symbolically shown by the wire 76.

The outputs from the ring translator are fed into logic gates, symbolically shown by the two NAND gates 77, 78. A second input on the NAND gate 77 is energized if the elicited information relates to a called line (the connection is progressing in a forward direction). A second input on the NAND gate 78 is energized if the elicited information relates to a calling subscriber (the calling subscriber is connected to the reverse end of the connection). Some would call the "forward" connection a "terminating" connection and the "reverse" connection an "originating" connection.

On terminating calls, the central processor energizes the scan register to select a wire in the ring translator. The memory 68 is read out and the NAND gate 77 conducts.

The output of the ring translator is thus fed into a memory word register 79. If, as has been assumed, this is a terminating call, the output from circuit 79 is applied through the terminal 80 to the central processor where it is used to complete the call.

If the information is from an originating subscriber, the memory address scan register energizes a first wire in the ring translator, and the central processor dumps a binary address word into the memory word register 79. The sources of this address word and reasons for supplying it are irrelevant to the invention. However, to provide a concrete example, it may be assumed that a register for automatic billing quipment has equipment location numbers stored therein. In such a case, the billing equipment needs to have the directory number of the calling subscriber so that proper charges may be assessed.

In the specifi example referred to above, the memory address scan register 75 energizes the first wire while the central processor energizes conductor 81. The NAND gates represented by gate 78 conduct and energize one set of inputs to a compare circuit 82 while the memory word register 79 energizes another set of inputs to the compare circuit 82. The chances are strong that the first comparison will not be correct. Hence the compare circuit 82 pulses a lead 83 and updates the memory address scan register 75, thereby driving it to energize the next wire threading the read only memory 68. If there is no comparison, the wire 83 is pulsed again and the register 75 updates itself one count in order to energize the next wire threading the read only memory.

The process continues until the scanner 75 energizes a wire which produces a signal that causes a coincidence in the comparison circuit 82. Responsive thereto, the updating pulses sent via the wire 83 terminate. The scanner 75 stops in a position which identifies the directory number of the pertinent subscriber line. The central processor may then proceed to utilize this information in any appropriate manner. In the assumed case, it could instruct automatic billing equipment to print the calling party directory number on a toll ticket.

The nature of the central processor operations, as it relates to control of a system, may be understood more fully from the central, double line block 67 in FIG. 1. The wired program 85 includes conventional equipment, such as logic gates, counters, memory devices and the like, interconnected by a configuration of wires which causes the system to go through an established routine which is dictated by the demands being placed upon the system.

The program address register 86 is a complex clock which gives a series of time frame signals. These signals are combined in any convenient coded combinations depending upon the sequence of events necessary to a given function. The logic of the system selects a predetermined coded combination of such frames according to the demands then prevailing in the system. This way, a particular part of a program may be exercised to cause the system to perform a given task.

At 87, the memory address register 75 continuously scans all of the peripheral equipment via the wires 88 to determine whether service is being demanded. When a peripheral circuit wishes to make a demand it returns a signal via the wires 89 during the time interval in which it is being scanned on wires 88. Depending upon the nature of the peripheral equipment returning the signal on the wires 89, a scanner concentrator 91 individualizes the peripheral service demand to the appropriate parts of the wired logic and thereby enables a selection of the properly combined time signals from the program address register.

The memory address scan register is given the directory number appropriate to the demanded function. For example, if the peripheral equipment which is demanding service is a setter 57 about to make a connection to a called line, the central processor recognizes the identity of the setter 57 and scans its memory for the status of the call being processed by that setter. The central processor recognizes the call condition as one for terminating the call to a called line, and it knows the directory number of the called line. Therefore, the central processor sets that called directory number in the memory address scan register.

The memory scan register 75 energizes a particular wire threading the ring translator which individually describes the called subscriber line. Responsive to the read out caused by energization of that wire, the binary address word read out of the read only memory is stored in a memory word register and forwarded to the wired program. The wired program is aware that this is a terminating call because that is the function being performed by the peripheral setter which responded to a demand signal on the wires 89 during the time interval while it was being scanned on the wires 88. The central processor also knows that certain individual bits in the binary word stored in the memory word register are the instructions required to process a call to this particular terminating line. Accordingly, the wired logic 85 proceeds to carry out the instructions indicated in the selected bits of the binary word stored in the register 79. For the example of a termination to a called line, these bits might tell the location of a crosspoint connected to that line, the nature of the ringing current required to signal the called station, the PBX or call transfer hunting cycles, if any, the priority of service required, or the like.

The foregoing description was based upon an assumption that a call is being terminated to a called line. However, the principle is the same regardless of the function being performed. Thus, it is possible that a register interface 62 returns a demand over the wires 89. The central processor proceeds in essentially the same manner except that priority is granted to a demand from the register interface because it must empty itself before the subscriber can send the next digit in the directory number of the called line.

To give priority, the central processor scanner 87 is adapted to follow a sequence by which it looks at each register interface circuit 62 at fixed points in a program, and at the end of a certain maximum time interval following each previous scan of the register interfaces. This way, every register interface is certain to be emptied during a time interval which is shorter than the shortest inter-digit time interval during which a subscriber can send a digit if he is using the fastest known dialing process.

Figures 4, 5:
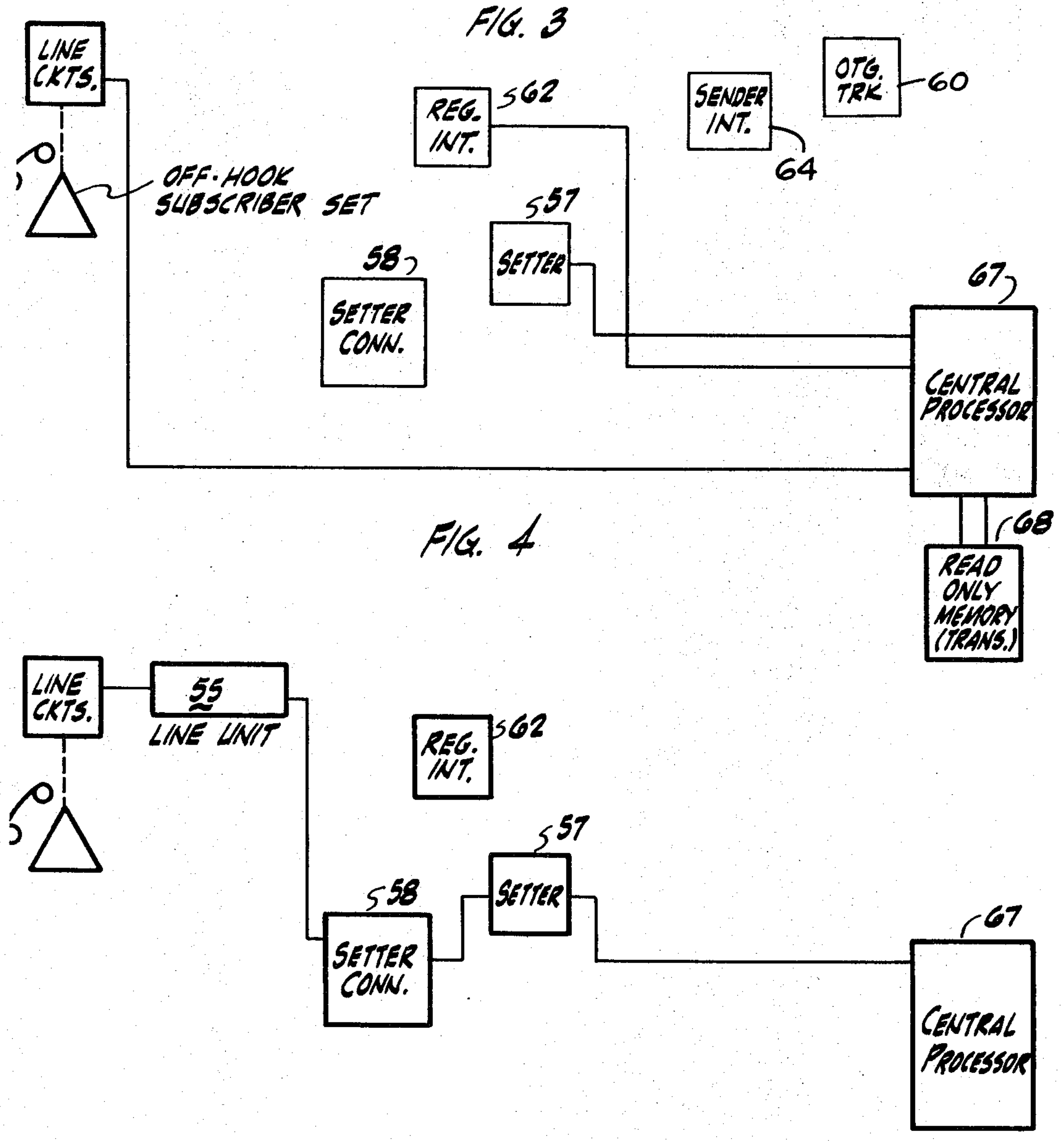
FIGS. 4–11 are fragmentary parts of FIG. 2 which show the steps which are followed to complete an exemplary call from a line to an outgoing trunk line leading to a distant office.

Keeping the foregoing description in mind, the reader will probably understand the invention best from the following description of how the system operates while several exemplary calls are completed through the network. For this description reference may be had to the remaining fragmentary block diagrams (FIG. 4, et seq.). While these diagrams have not been described in detail heretofore, it should be obvious that each of these blocks is also included in the complete diagram of FIG. 2. To facilitate this description, only those blocks are drawn which are pertinent to the particular function being described. The blocks representing functions actually being performed are shown by lightly inked blocks. The lines interconnecting the various boxes are the data bus highways actually being used to perform the functions being described.

Dial tone connections are those connections which are completed from a calling subscriber line to a register interface circuit 62. They are the first to be described in the following:

A calling subscriber station goes off-hook to demand service in FIG. 4. The central processor operates the scanner 87 to enable each piece of peripheral equipment to demand service. Therefore, after a brief interval, the line circuit of the off-hook subscriber station gives a demand over line 89 which the central processor recognizes as an unserved calling subscriber. Moreover, the central processor realizes that it must extend a path from the matrix appearance of the line demanding service through the line unit 55 to an idle register interface unit 62. This matrix appearance is the equipment location of the calling line circuit, and it may be converted into the calling subscribers directory number by the reverse translation process explained above in connection with FIG. 3. Since the originating class of service is also a function of the subscriber's appearance on the matrix, the central processor has not only the subscriber location but all information about service given him. By presenting the read-only memory with this information, the central processor is able to obtain the locations of a group of register interfaces which may be used to make the most efficient use of the matrix, and which is compatible with the dial at the calling subscriber station. An idle register interface is then selected by scanning within this group.

Having obtained the location of the demanding line (source) and the selected register interface (destination), the central processor is ready to find a path between them. First, however, a setter 57 (time level interface circuit for the matrix) is needed to operate the setter connector 58 and the network 55 matrix relays. Therefore, an idle setter 57 is selected and instructed to operate the connector so that connections from the proper matrix elements are brought to the central processor for the path selection. The central processor may perform any other functions during the time required for this relay operation.

By scanning the setters at a later time, the central processor determines the setter 57 does not have to remain with this call; instead, it has performed its function. Then the central processor will proceed to check the elements of the matrix for the idle path. After having found a path, the central processor instructs the setter 57 as to the identity of the crosspoint operating elements to be energized. Again, the central processor performs other functions after which it returns to the setter 57 to be sure that it has performed its function. The line demanding service is now connected to the register interface 62 and dial tone is returned to the calling subscriber.

Other connections are made in a manner similar to the above.

Another important function of the central processor is to process the dialed digits as indicated in FIGS. 5. The digits are dialed one at a time into the register interface which is only capable of counting the dial pulses (or decoding MF signals) for one digit at a time. When the register interface 62 recognizes that it has received one complete digit, it requests the central processor to take the digit. The central processor determines that this condition exists by scanning the register interfaces. When a request is found, the central processor transfers the digit from the register interface into a memory which also stores all the information pertaininng to this call.

As each digit comes into the register interface 62, the central processor takes it, processes it, and stores it. During the processing of each digit, the central processor takes it and other pertinent information and presents it to the memory 68 for translation. In accordance with a predetermined code, the central processor knows whether a correct and complete translation has been made. If not, the central processor returns the digit to storage and repeat the process after another digit has been received during this call.

Figure 6:
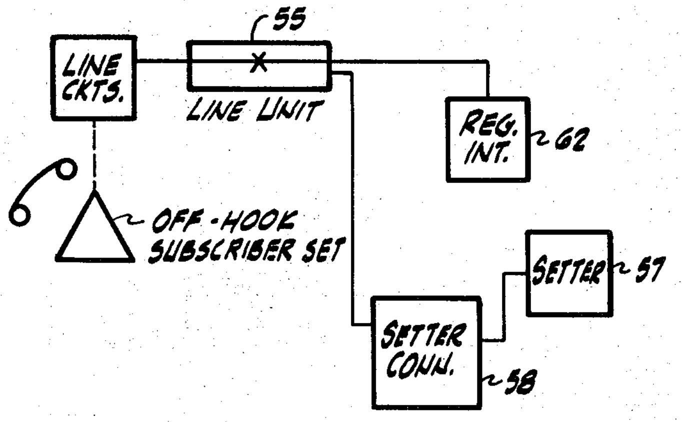
Figure 7:
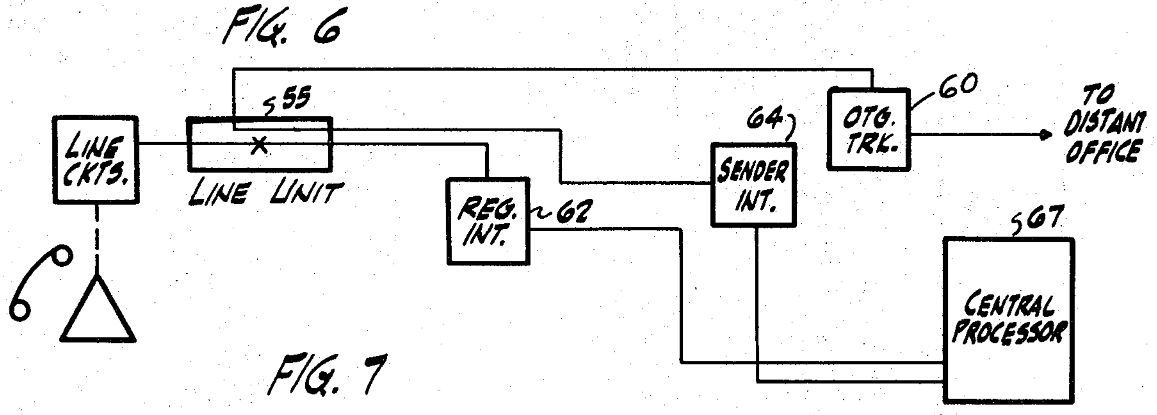

When a complete code translation has been made, the central processor knows which step is to be performed next, and it takes action accordingly. For example, the sender interface 64 may be seized and associated with the trunk 60 via the network line unit 55 (FIG. 6). Then the central processor passes the digits one at a time to the sender interface 64. Again, the central processor does not have to remain with the call while the sender interface 64 is sending out to a trunk 60. Instead, the processor goes on serving other calls, returning to forward another digit to the interface 64 when it is time to send out the next digit (FIG. 7).

Figure 8:
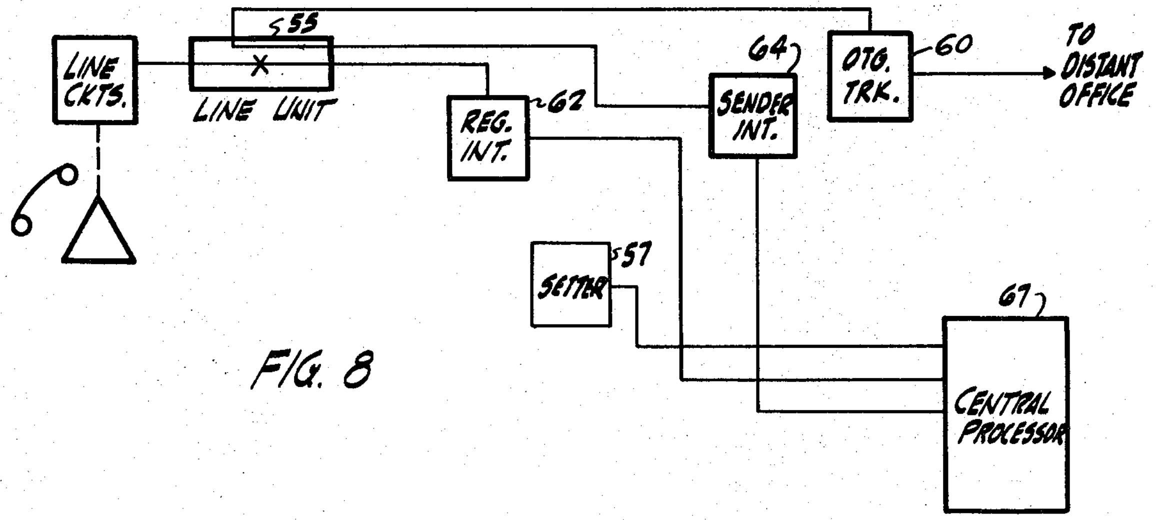

Eventually (FIG. 8), the processor has passed all of its stored digits (one at a time) to the sender interface 64. The sender has sent these digits through an outgoing trunk circuit 60 to a distant office. Hence, it is time to connect the calling subscriber station to the trunk circuit 60. Therefore, the processor selects a setter 57 preparatory to operation of the line unit 55.

Figure 9:
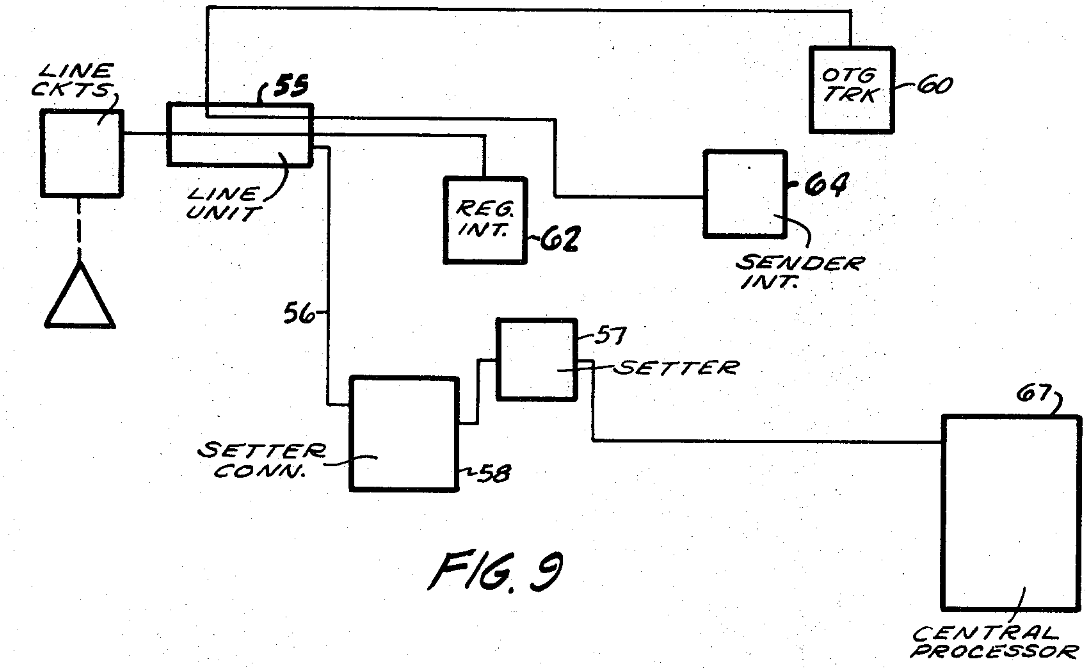
Figure 10:
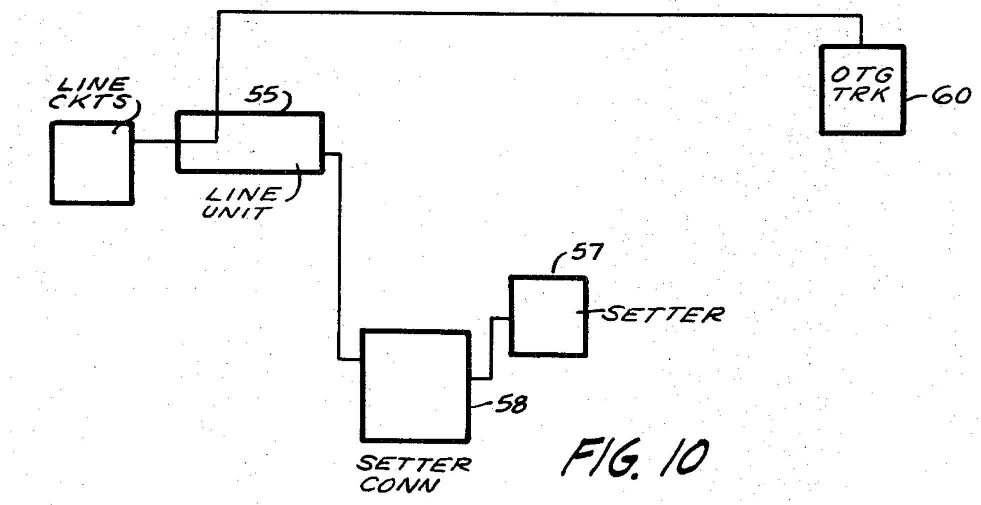

In FIG. 9, the central processor is shown as causing the setter connector 58 to interconnect the selected setter 57 and the appropriate line unit. Then, the processor passes information relative to the selected crosspoints to the setter 57. The setter operates (FIG. 10), and the calling line is connected through the line unit 55 to the selected outgoing trunk 60. The calling line is connected to the distance office where any suitable equipment operates to complete the call in any known manner.

Figure 11:
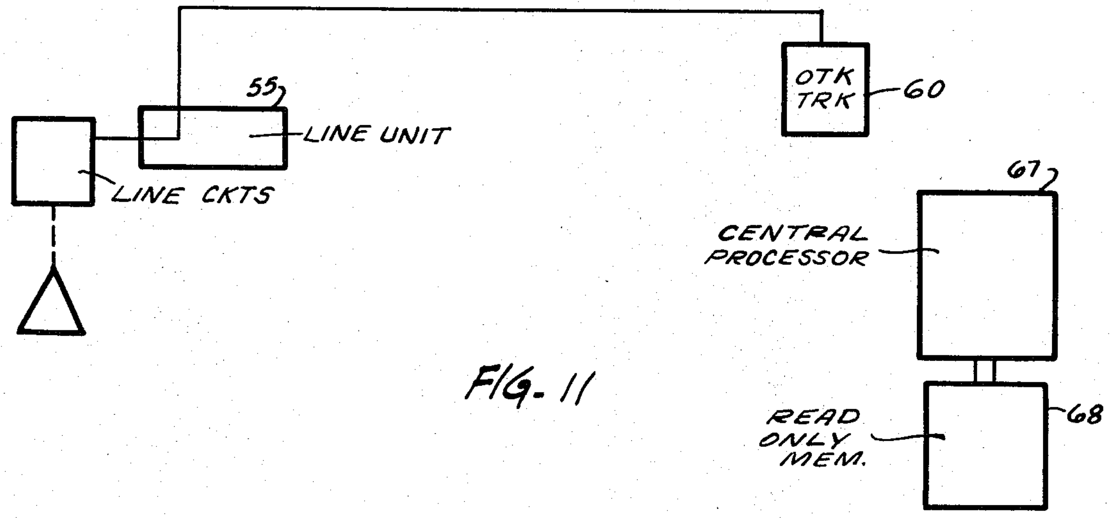

In FIG. 11, the processor has released all peripheral equipment such as setters, setter connectors, register or sender interfaces, and the like. Then, the central processor interrogates the read only memory 68 to ascertain all of the pertinent information required to describe the call. This information is then passed on to automatic billing equipment where a toll ticket is made.

The steps in the call which are explained by the fragmentary block diagrams of FIGS. 4–11 are exemplary not only of these, but of many other calls requiring many other steps. However, it is thought that after they have studied FIGS. 4–11, those who are skilled in the art will readily perceive how any call may be completed through the system in a similar manner. Accordingly, the invention is not to be construed as limited to the described equipments and operations. On the contrary, it is to be construed to include all equivalents reasonably falling within the true scope of the invention.

While the principles of the invention have been described in connection with specific apparatus, it is to be clearly understood that this description is made only by way of example and not as a limitation on the scope of the invention.

We claim:

1. An automatic switching system comprising a switching network having a plurality of lines connected to one side and a plurality of trunks connected to the other side, central data processor means for controlling said network, memory means for converting data received by said processor into data usable by said processor, said memory means comprising a ring translator and means for reading said translator in a forward direction in order to convert directory numbers into binary address words and in a reverse direction in order to convert at least a part of said address words into said directory numbers.

2. The system of claim 1 and clock means for providing a program of time frames for enabling said central processor to command said network to perform different types of functions, and means responsive to said binary address words for selecting particular parts of said program.

3. The system of claim 2 and means for repeatedly interrogating said memory means as said central processor advances the functioning of said system.

4. The system of claim 3 and means for selectively enabling different parts of said binary address words to control said central processor responsive to said repeated underrogations.

5. The system of claim 1 and a plurality of peripheral equipments interposed between said network and said central processor for interfacing dissimilar equipments.

6. The system of claim 5 and means in said central processor for scanning said peripheral equipments, and means in said peripheral equipments for demanding service responsive to the scanning thereof.

7. The system of claim 6 and means responsive to said demands for selectively giving some of said peripheral equipments priority over other of said peripheral equipments.

8. A switching system comprising a plurality of individual line units, each of said line units comprising inlets, outlets, and a plurality of crosspoint for selectively connecting any of said inlets to any of said outlets, at least some of the outlets in each of said line units being interconnected by a number of junctor wires with the outlets in other of said line units, electronic data processor means for selectively operating said cross points, and read only memory means for selectively delivering to said processor either data concerning said inlets which is translated into data concerning said outlets or data concerning said outlets which is translated into data concerning said inlets.

9. The system of claim 8 and a program of time related functions, and means responsive to operation of said central processor for selecting predetermined parts of said program.

10. The system of claim 9 and means in said central processor for repeatedly interrogating said memory means, and means responsive to each interrogation for selecting another part of said program.

11. The system of claim 10 means for giving certain parts of said program priority over other parts of said program.

12. A read only memory comprising a ring translator, a plurality of wires threading the cores of said ring translator in coded combinations, means responsive to the energizing of any selected one of said wires for reading out a binary word corresponding to the coded combination in which the selected one of said wires threads said cores, means for storing selected ones of said binary words, and means for scanning said wires to find the wire having a binary word output corresponding to said stored word.

13. The memory of claim 12 wherein each of said wires corresponds to predetermined ones of many pieces of equipment, and said binary words comprise individual instructions for serving the corresponding piece of equipment.

14. The memory of claim 13 and peripheral equipment for selectively providing signals representing different types of functions for said pieces of equipment responsive to said instructions, means for scanning said pieces of equipment and said peripheral equipments to find demand signals, and means responsive to a detection of a demand signal for interrogating said memory to ascertain the instructions required to serve said demand.

References Cited

UNITED STATES PATENTS

| | | |
|---|---|---|
| 3,403,383 | 9/1968 | Kienzle et al. |
| 3,365,548 | 1/1968 | Lucas et al. |
| 3,312,785 | 4/1967 | Fujinaka. |
| 3,270,141 | 8/1966 | Wichman. |
| 2,922,996 | 1/1960 | Young. |

KAHLEEN H. CLAFFY, Primary Examiner

T. W. BROWN, Assistant Examiner